(12) United States Patent
Ritenour

(10) Patent No.: US 7,200,946 B2
(45) Date of Patent: Apr. 10, 2007

(54) ALIGNMENT APPARATUS

(76) Inventor: Ernest C. Ritenour, 119 Liberty Dr., Bolivar, PA (US) 15923

(*) Notice: Subject to any disclaimer, the term of this patent is extended or adjusted under 35 U.S.C. 154(b) by 0 days.

(21) Appl. No.: 10/900,597

(22) Filed: Jul. 28, 2004

(65) Prior Publication Data

US 2005/0022400 A1 Feb. 3, 2005

Related U.S. Application Data

(60) Provisional application No. 60/490,620, filed on Jul. 28, 2003.

(51) Int. Cl.
*G01C 1/02* (2006.01)
*G01C 5/00* (2006.01)

(52) U.S. Cl. .............................................. 33/292

(58) Field of Classification Search .............. 33/292, 33/370, 286, 227, 228, 263, 276, 277, 283, 33/295, 296
See application file for complete search history.

(56) References Cited

U.S. PATENT DOCUMENTS

| | | | | |
|---|---|---|---|---|
| 1,655,627 A | * | 1/1928 | Rothweiler | 33/292 |
| 2,896,327 A | * | 7/1959 | Thomann | 33/292 |
| 2,995,834 A | * | 8/1961 | Rowe | 33/276 |
| 3,533,700 A | * | 10/1970 | Alexander | 33/286 |
| 3,545,086 A | * | 12/1970 | Brill et al. | 33/228 |
| 3,570,130 A | * | 3/1971 | Boehm | 33/295 |
| 3,737,232 A | * | 6/1973 | Milburn, Jr. | 33/276 |
| 4,082,466 A | * | 4/1978 | Underberg | 33/292 |
| 4,691,444 A | * | 9/1987 | Capps | 33/290 |
| 5,459,934 A | * | 10/1995 | Heroux | 33/373 |
| 5,894,344 A | * | 4/1999 | Tamez et al. | 33/292 |
| 6,487,781 B2 | * | 12/2002 | Johnson | 33/285 |

* cited by examiner

*Primary Examiner*—Christopher W. Fulton
(74) *Attorney, Agent, or Firm*—The Webb Law Firm

(57) ABSTRACT

An alignment apparatus includes a central leg element and one or more secondary support leg elements in operative communication with the central leg element for providing support thereto. A sighting device rotatably attached to the central leg element includes an optical device having at least one optical element therein for permitting a user to view an area of interest in the direction of an optical device axis of sight and a laser-emitting device for emitting a laser beam along a laser axis of projection. The laser axis of projection is parallel to the optical device axis of sight. A method of aligning an underground structure is also disclosed.

16 Claims, 2 Drawing Sheets

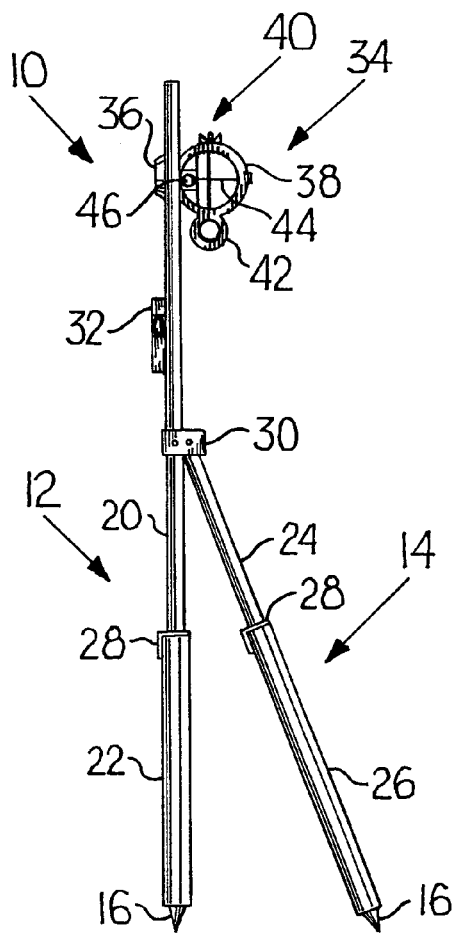
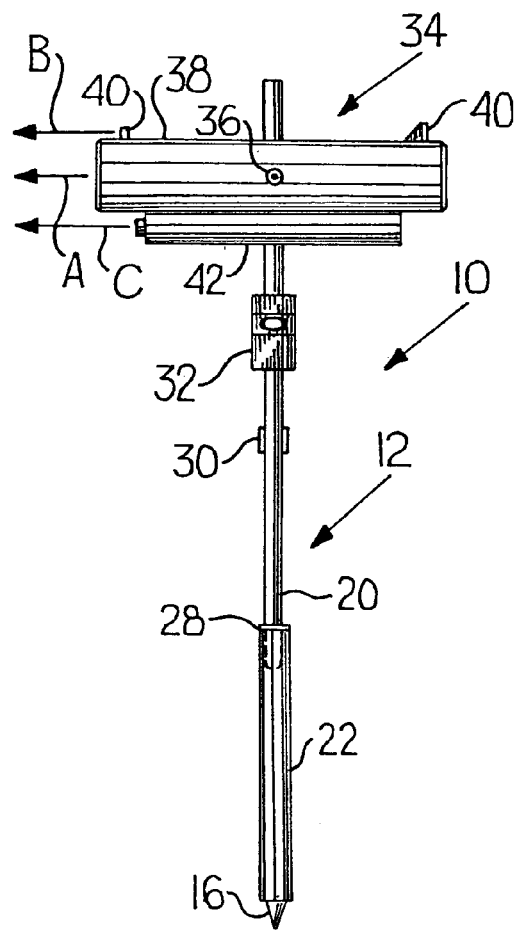
Fig. 1    Fig. 2
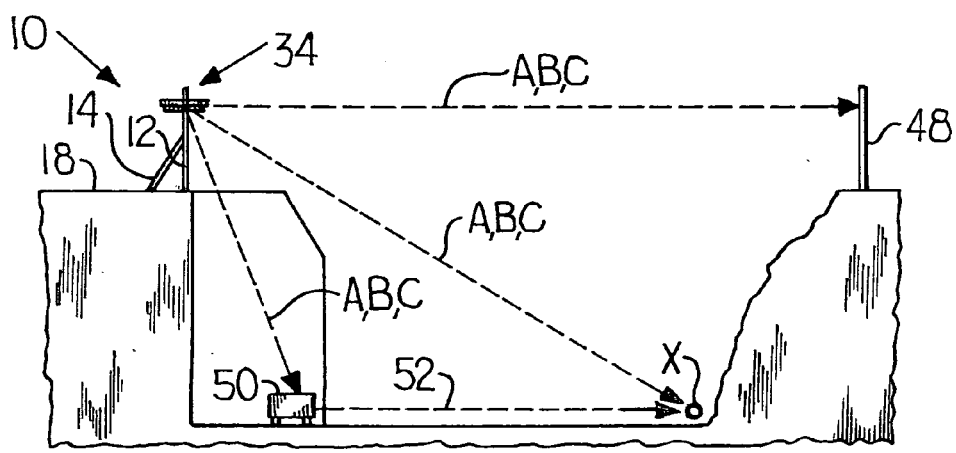
Fig. 3

ALIGNMENT APPARATUS

CROSS REFERENCE TO RELATED APPLICATIONS

This application claims the benefit of U.S. patent application Ser. No. 60/490,620, filed Jul. 28, 2003, which is herein incorporated by reference in its entirety.

BACKGROUND OF THE INVENTION

1. Field of the Invention

The present invention relates generally to an alignment apparatus and sighting device and, in particular, to an alignment apparatus and sighting device for use in connection with underground or aboveground installations, such as piping, conduit, underground support structures, etc.

2. Description of Related Art

In order to properly align and install an underground structure, it is necessary to provide appropriate alignment apparatus and sighting devices, such that the underground structure, such as conduit, a manhole or the like, can be specifically aligned and positioned with respect to precedent and subsequent structures. With the advent of new technology, in order to obtain a visual cue as to the proper positioning and orientation of a length of conduit or positioning of a subsequent manhole, a laser device is typically placed in an underground position, such as within a pre-existing manhole. This laser device emits a laser beam, which is visible and extends to a great length if uninterrupted. Therefore, the use of a laser device within the manhole will provide appropriate object locations in the direction of interest and along a horizontal vector with respect to the ground surface or existing conduit.

However, the laser device alone is not enough to effectively place the next manhole or target location, which will be initially positioned at the ground surface. Therefore, an alignment apparatus is required for use in conjunction with the laser device in targeting or precisely locating the next manhole or target location.

According to the prior art, the alignment apparatus that is used in connection with the laser device is a transit device, or line transfer instrument. However, such transits or line transfer instruments are exceedingly expensive and delicate in operation. These instruments are mounted on a tripod or holding platform, and these platforms must be suspended or mounted directly over the laser device in the pipe. However, with the present use of pre-poured flow lines, this may not be an option. Still further, this setup procedure is a tedious and time-consuming operation that requires patience, knowledge and extensive training. A typical laborer would not have the knowledge or training to operate such equipment. In addition, with the use of such intricate machinery and devices, great care should be taken in their utilization, which is often difficult since the alignment apparatus is used in unfavorable and hostile environments. Continuous subjection to dust, rain or mud will seriously hamper, if not cease, the proper operation of these instruments.

Another typical alignment apparatus that is not expensive or delicate to operate would be a plumb bob or string line. However, such apparatus lacks sophistication and precision. Since precision is particularly required in this application, there is considerable room in the art for improvement in the use and development of effective alignment apparatus and devices.

It is, therefore, an object of the present invention to provide an alignment apparatus that overcomes the deficiencies of the prior art. It is another object of the present invention to provide an alignment apparatus that is particularly useful in connection with installing underground structures, such as the installation of manholes, underground conduit, etc. or aboveground structures, such as a fence line and the like. It is another object of the present invention to provide an alignment apparatus that is relatively inexpensive and easy to operate. It is a further object of the present invention to provide an alignment apparatus that has an easy setup procedure and requires minimal knowledge and/or training for appropriate operation. It is a still further object of the present invention to provide an alignment apparatus that is adaptable and capable of effectively operating in hostile environments.

SUMMARY OF THE INVENTION

The present invention is an alignment apparatus for use in connection with underground or aboveground structure installations. The alignment apparatus includes a central leg element and at least one secondary support leg element in operative communication with the central leg element for providing support to the central leg element. The alignment apparatus also includes a sighting device rotatably attached to the central leg element, and the sighting device has an optical device with at least one optical element therein for permitting a user to view an area of interest in the direction of an optical device axis of sight. Further, the sighting device includes a laser-emitting device for emitting a laser beam along a laser axis of projection, and the laser axis of projection is parallel to the optical device axis of sight.

In one preferred embodiment, the sighting device also includes at least one mounted gun-type sight having an aligned gun-type sight axis of sight parallel to the optical device axis of sight. Still further, and in another preferred and non-limiting embodiment, the alignment apparatus includes a level vial device attached to the central leg element for assisting in the vertical alignment of the central leg element with respect to a ground or set horizontal surface or plane.

The present invention is also directed to a method of aligning an underground structure. This method includes the steps of: positioning a user behind a pipe laser-emitting device located in an underground area and emitting a laser along a horizontal vector towards a point X; holding an alignment apparatus having a sighting device positioned thereon in a substantially vertically plumb position; aligning the pipe laser-emitting device in an intended target position into a vertical plane to point X; rotating the sighting device until the line of sight intersects point X; vertically aligning the apparatus; and aligning the pipe laser-emitting device.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 1 is a front view of a preferred embodiment of an alignment apparatus according to the present invention;

FIG. 2 is a side view of the alignment apparatus of FIG. 1;

FIG. 3 is a side schematic view of an alignment apparatus according to the present invention in operation.

DESCRIPTION OF THE PREFERRED EMBODIMENTS

Figure 4:
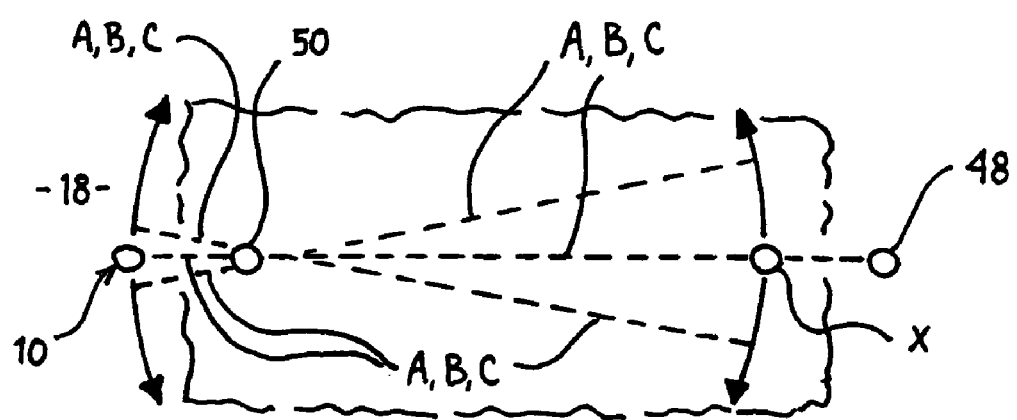
FIG. 4 is a plan schematic view of the alignment apparatus of FIG. 3 in operation.

For purposes of the description hereinafter, the terms "upper", "lower", "right", "left", "vertical", "horizontal", "top", "bottom", "lateral" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to an alignment apparatus 10 for particular use in connection with underground installations of manholes, conduits, piping and similar underground structures or aboveground structures, such as a fence line, filed markings, etc. The alignment apparatus 10 includes a central leg element 12 and at least one secondary support leg element 14 in operative communication with the central leg element 12. The secondary support leg element 14 is used to provide added support and stability to the central leg element 12, which adds additional support and stability to the alignment apparatus 10. In one preferred and non-limiting embodiment, both the central leg element 12 and the secondary support leg element 14 include a pointed cap element 16 positioned on a distal end of the central leg element 12 and the secondary support leg element 14. This pointed cap element 16 permits the user to easily anchor the alignment apparatus 10 into a ground surface 18, such as dirt, asphalt, concrete, the manhole, etc.

Further, in the preferred embodiment, both the central leg element 12 and the secondary support leg element 14 are extendable. Specifically, the central leg element 12 includes a central leg element inner portion 20 and a central leg element outer portion 22. The central leg element inner portion 20 is configured to slide within the central leg element outer portion 22, thus providing the central leg element 12 with an extending functionality. Similarly, the secondary support leg element 14 includes a secondary support leg element inner portion 24 and a secondary support leg element outer portion 26 and as described above, the secondary support leg element inner portion 24 is receivable and slideable within the secondary support leg element outer portion 26, again providing the secondary support leg element 14 with the ability to extend and adjust in various situations and according to various heights of the user. In order to prevent the central leg element 12 and the secondary support leg element 14 from sliding during operation, a clamp mechanism 28 is attached between and clamps the central leg element inner portion 20 with respect to the central leg element outer portion 22, and a further clamp mechanism 28 clamps or holds the secondary support leg element inner portion 24 with respect to the secondary support leg element outer portion 26. The clamp mechanism 28 is removable and allows the user to easily unlock, adjust (extend) and re-lock both the central leg element 12 and the secondary support leg element 14.

The secondary support leg element 14 is connected to the central leg element 12 by a swivel mount mechanism 30. This swivel mount mechanism 30 allows the secondary support leg element 14 to swivel around the central leg element 12, such that it can be placed in various positions, with the central leg element 12 acting as the central point. In addition, the swivel mount mechanism 30 allows the secondary support leg element 14 to rotate toward and away from the central leg element 12, again providing the appropriate flexibility for positioning the secondary support leg element 14 with respect to the central leg element 12.

In addition, while only one secondary support leg element has been discussed, it is envisioned that any number of secondary support leg elements 14 could be used. For example, using two secondary support leg elements 14 would provide an alignment apparatus 10 with a tripod support. Still further, the swivel mount mechanism 30 allows for ease in the holding of the alignment apparatus 10 in a plumb vertical position. The swivel mount mechanism 30 may also include a swivel mount locking device or other means for releasably clamping the secondary support leg element 14 in a desired position and preventing the secondary support leg element 14 from rotating, pivoting or otherwise moving with respect to the central leg element 12.

A level vial device 32 is attached to the central leg element 12, preferably in a central position above the swivel mount mechanism 30. This level vial device 32 aids the user in plumbing the device vertically with respect to the ground surface or other horizontal plane. Any typical vial device 32 is envisioned, and the level vial device 32 is mounted on the central leg element 12 in either a permanent or non-permanent manner. For example, the level vial device 32 may be removable, such that if this level vial device 32 breaks or otherwise becomes inoperative, a new level vial device 32 may be installed thereon.

Near an upper end of the central leg element 12 is a sighting device 34. The sighting device 34 is rotatably attached to the central leg element 12 by a sighting device swivel mount mechanism 36. The swivel mount mechanism 36 allows the sighting device 34 to rotate 360° in a plane parallel to the longitudinal axis of the central leg element 12. In addition, the sighting device 34 includes multiple subcomponents that provide the alignment apparatus 10 with its functionality. Specifically, in one preferred and non-limiting embodiment, the sighting device 34 includes an optical device 38 having at least one optical element therein that permits a user to view an area of interest in the direction of an optical device axis of sight A (see FIG. 3). The optical device may be a lens arrangement, as is known in the art, and this lens arrangement may include one or more lenses associated therewith.

In addition, at least one mounted gun-type sight 40 is mounted on or otherwise used in connection with the optical device 38. The gun-type sight 40 has an aligned gun-type sight axis of sight B that is parallel to the optical device axis of sight A. Finally, a laser-emitting device 42 is likewise attached to or used in connection with the optical device 38 and emits a laser beam along a laser axis of projection C. The laser axis of projection C is parallel to the optical device axis of sight A. Using the optical device 38, the gun-type sight 40 and the laser-emitting device 42, the alignment apparatus 10 provides multiple and mutually aligned optical and visual alignment tools.

In a preferred and non-limiting embodiment, and when sighting through the optical device 38, a crosshair marking 44 is provided. The crosshair marking 44 includes a vertical crosshair and a horizontal crosshair, and these crosshairs are both parallel and perpendicular to the central leg element 12, as is known in the art. In addition, when looking through the optical device 38, an optical device level vial device 46 is in the user's line of sight. Therefore, the user does not need to continually break his or her line of sight and examine the level vial device 32, but instead may merely observe the optical device level vial device 46 already provided in the user's line of sight. In addition, optical device level vial device 46 will assure sighting targets in a vertical plane. Further, the lenses of the optical device 38 can be magnifiable or otherwise adjustable to aid in sighting an area of interest in the direction of the optical device axis of sight A.

The gun-type sight 40, typically constituting a forward and rear gun-type sight, provides for the quick alignment of targets in a rough gun-type sight axis of sight B. Similarly, the laser-emitting device 42, including "on" and "off" capabilities, is mounted such that the laser axis of projection C is aligned in the same vertical plane as the crosshairs 44 in the optical device 38 in the gun-type sight 40. The use of the laser-emitting device 42 will facilitate the alignment process in low-light situations. As discussed above, the gun-type sight 40 and the crosshair markings 44 in the optical device 38, together with the laser-emitting device 42, are aligned in the same operative plane.

In operation and for an underground installation, the alignment apparatus 10, and specifically the sighting device 34, is grasped from behind and above the laser-emitting device 42 and in the direction of a target position 48. Typically, a user stands or kneels behind a pipe laser-emitting device 50 located in a manhole or in another underground area. The alignment apparatus 10 is held in a vertically plumb position with one hand, and the operator then uses the other hand to operate the sighting device 34. By using the gun-type sight 40, the laser-emitting device 42 and/or the optical device 38, the operator aligns the pipe laser-emitting device 50 in the intended target position 48 into a vertical plane, or point X in FIG. 3. Since the pipe laser-emitting device 50 is emitting a laser 52 in a horizontal direction, the user must rotate the sighting device 34 until it intersects point X. The vertical alignment is accomplished by moving the alignment apparatus 10 slightly right or left. It is necessary that the operator maintain plumbness while sighting the target position 48. After the vertical point is achieved between the pipe laser-emitting device 50 and the intended target position 48, the pipe laser-emitting device 50 can be aligned. Using internal pipe lasers, remote controls or other devices, the operator may move the pipe laser-emitting device 50 in the same vertical plane with the use of one or more of the subcomponents of the sighting device 34 of the alignment apparatus 10.

In this manner, the alignment apparatus 10 provides a fast and reliable alignment of a pipe laser-emitting device 50. Its simple function permits operation by a common laborer with little training or knowledge in its use. In addition, the alignment apparatus 10 of the present invention eliminates the tedious time-consuming hassle of setting, leveling and aligning the delicate and expensive equipment presently used. This saves time and money, and thereby increases profits. Further, with the simple and inexpensive design of the alignment apparatus 10, the alignment apparatus 10 is well suited for operation in harsh construction environments.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method of aligning an underground structure to a target position, comprising the steps of:
    positioning a user behind and above a pipe laser-emitting device located in an underground area;
    emitting a laser from the pipe laser-emitting device along a horizontal vector;
    holding, by the user, a portable alignment apparatus having a sighting device positioned thereon in a substantially vertically plumb position and in line with the pipe laser-emitting device and the target position; and
    aligning the laser emitted from the pipe laser-emitting device towards a point X in vertical alignment with the target position by:
        (i) rotating the sighting device until the line of sight intersects point X; and
        (ii) aligning the laser emitted from the pipe laser-emitting device to point X.

2. The method of claim 1, wherein the underground structure is a manhole, a conduit or any combination thereof.

3. The method of claim 1, wherein the alignment of the laser emitted from the pipe laser-emitting device is automated.

4. The method of claim 1, further comprising the step of establishing the target position through use of a target stake by positioning the target stake in an aboveground position substantially across from the user.

5. The method of claim 1, wherein the alignment apparatus comprises a central leg element and a sighting device rotatably attached to the central leg element, the sighting device fully rotatable in a vertical plane parallel with the central leg element, wherein the sighting device includes an optical device having at least one optical element therein and is configured to permit a user to view the target position and point X in the direction of an optical device axis of sight.

6. The method of claim 5, wherein the sighting device further comprises at least one mounted gun-type sight having an aligned gun-type sight axis of sight parallel to the optical device axis of sight.

7. The method of claim 5, wherein the alignment apparatus further comprises a level vial device attached to the central leg element for assisting in vertically aligning the central leg element with respect to a ground surface at the user's position.

8. The method of claim 5, further comprising the step of providing support to the central leg element through use of at least one secondary support leg element in operative communication therewith.

9. The method of claim 8, wherein the central leg element, the at least one secondary leg element or any combination thereof is laterally extendable and adjustable.

10. The method of claim 8, wherein the at least one secondary support leg element is movably attached to the central leg element, such that the secondary support leg element may be at least one of substantially rotated around the central leg and pivoted away from and towards the central leg element.

11. The method of claim 5, further comprising the step of anchoring the central leg element into the ground surface through use of a substantially pointed end cap positioned on a distal end of the central leg element.

12. The method of claim 5, wherein the optical element of the optical device comprises a lens arrangement including at least one lens and configured to permit a viewer to observe objects through the lens arrangement.

13. The method of claim 12, wherein the at least one lens includes a crosshair marking disposed thereon, the crosshair marking having a vertical crosshair substantially parallel to the central leg element and a horizontal crosshair substantially perpendicular to the central leg element.

14. The method of claim 12, wherein the optical device, the optical element, the lens arrangement or any combination thereof includes an optical device level vial device positioned in a user's line of sight, such that the user is not required to break the line of sight during a positioning operation.

15. The method of claim 5, wherein the optical device includes a laser-emitting device configured to emit a laser beam along a laser axis of projection, wherein the laser axis of projection is parallel to the optical device axis of sight.

16. The method of claim 5, wherein the sighting device further comprises a forward gun-type sight mounted on a first end of the sighting device and a rear gun-type sight mounted on a second end of the sighting device, the forward and rear gun-type sights having an aligned gun-type sight axis of sight parallel to the optical device axis of sight.

* * * * *